US010382697B2

(12) United States Patent
Makita (10) Patent No.: US 10,382,697 B2
(45) Date of Patent: Aug. 13, 2019

(54) LENS APPARATUS AND IMAGE PICKUP SYSTEM HAVING THE SAME

(71) Applicant: CANON KABUSHIKI KAISHA, Tokyo (JP)

(72) Inventor: Keisuke Makita, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 464 days.

(21) Appl. No.: 15/093,076

(22) Filed: Apr. 7, 2016

(65) Prior Publication Data

US 2016/0299314 A1    Oct. 13, 2016

(30) Foreign Application Priority Data

Apr. 10, 2015  (JP) .................................. 2015-081282

(51) Int. Cl.
*G02B 7/10* (2006.01)
*H04N 5/232* (2006.01)
*G03B 5/00* (2006.01)

(52) U.S. Cl.
CPC ........... *H04N 5/23296* (2013.01); *G03B 5/00* (2013.01); *G02B 7/102* (2013.01); *G03B 2205/0046* (2013.01); *G03B 2205/0053* (2013.01)

(58) Field of Classification Search
CPC ...... H04N 5/23296; G02B 7/102; G03B 5/00; G03B 2205/006; G03B 2205/0053
USPC ........................................................ 359/697
See application file for complete search history.

(56) References Cited

U.S. PATENT DOCUMENTS

| 5,905,530 A | * | 5/1999 | Yokota | H04N 5/217 |
| | | | | 348/240.99 |
| 8,125,542 B2 | | 2/2012 | Ishikawa | |
| 9,720,206 B2 | * | 8/2017 | Suzuki | G02B 7/102 |

FOREIGN PATENT DOCUMENTS

| JP | H02125216 A | 5/1990 |
| JP | 11211962 A | 8/1999 |
| JP | 2006196965 A | 7/2006 |
| JP | 2012022123 A | 2/2012 |
| JP | 2012042554 A | 3/2012 |
| JP | 2014154905 A | 8/2014 |

OTHER PUBLICATIONS

Office Action issued in Japanese Appln. No. 2015-081282 dated Feb. 19, 2019.

* cited by examiner

*Primary Examiner* — Collin X Beatty
*Assistant Examiner* — Grant A Gagnon
(74) *Attorney, Agent, or Firm* — Rossi, Kimms & McDowell LLP (57) ABSTRACT

A lens apparatus includes a magnification variator configured to move during magnification variation, a drive unit that drives the magnification variator, an output unit that outputs a first drive command, and a controller configured to: derive, based on the first drive command, a second drive command so that the second drive command satisfies a predetermined condition related to a moving speed of the magnification variator and a variation of a field-of-view change rate in a case where the magnification variator is driven with the second drive command is smaller than a variation of a field-of-view change rate in a case where the magnification variator is driven with the first drive command; and control the drive unit based on the second drive command.

12 Claims, 9 Drawing Sheets

|  | Z12 | Z26 | Z40 | Z50 |
|---|---|---|---|---|
| COMMAND SPEED FROM OPERATION APPARATUS | 45.0 | 45.0 | 45.0 | 45.0 |
| CORRECTION VALUE | 1.05 | 0.88 | 0.87 | 1.41 |
| SPEED DERIVED BY FIELD-OF-VIEW CHANGE RATE CORRECTOR (FIELD-OF-VIEW CORRECTION SPEED) | 47.3 | 39.6 | 39.2 | 63.5 |

|  | Z12 | Z26 | Z40 | Z50 |
|---|---|---|---|---|
| COMMAND SPEED FROM OPERATION APPARATUS | 80.0 | 80.0 | 80.0 | 80.0 |
| CORRECTION VALUE | 1.05 | 0.88 | 0.87 | 1.41 |
| SPEED DERIVED BY FIELD-OF-VIEW CHANGE RATE CORRECTOR (FIELD-OF-VIEW CORRECTION SPEED) | 84.0 | 70.4 | 69.6 | 112.8 |
| SPEED DERIVED BY SPEED CORRECTOR (REVISED CORRECTION SPEED) | 82.7 | 73.6 | 73.1 | 100.0 |

LENS APPARATUS AND IMAGE PICKUP SYSTEM HAVING THE SAME

BACKGROUND OF THE INVENTION

Field of the Invention

The present invention relates to a lens apparatus and more particularly to a lens apparatus adapted to drive a movable optical member by electrical control. The present invention also relates to an image pickup system having such a lens apparatus.

Description of the Related Art

In conventional lens apparatuses used in moving image shooting, the change in the field of view relative to the amount of shift in zooming operation varies depending on the zoom position. (Hereinafter, the rate of change of the field of view relative to the zoom shift amount will be referred to as the field-of-view change rate.) Therefore, even when the zoom lens is driven at a constant speed using an actuator or the like, the field-of-view change rate is not constant, resulting in unnatural images in some cases. For example, when an object moving along the optical axis at a constant speed is to be shot in a specific image pickup area for a specific length of time while keeping the size of the object image constant, if the field-of-view change rate is substantially constant, the operation that the photographer needs to do is to input a command for driving the zoom at a constant speed for the specific length of time through a controller or the like. However, if the field-of-view change rate is not constant it is not possible by the above-described method (namely inputting a command for driving the zoom at a constant speed for the specific length of time) to keep the size of the object image constant within the image pickup area during image shooting, resulting in an unnatural image in some cases. To avoid this, the photographer needs to operate the controller (or adjust the zoom speed) in accordance with the size of the object image in the image pickup area. Such operation is troublesome.

Japanese Patent Application Laid-Open No. H11-211962 discloses a technology that makes the relationship between the focal length of a zoom lens and the field-of-view change rate variable when the speed signal for the zoom lens is constant. A zoom speed signal is set based on the varied field-of-view change rate and the position of the zoom lens and output to a drive circuit to drive the zoom lens.

One method for keeping the field-of-view change rate constant when the zoom lens is driven at a constant speed is to vary (increase and/or decrease) the zoom drive speed depending on the zoom position to make the field-of-view change rate substantially constant. However, in the case where this method is employed, if the zoom is driven at high speed, it is required in some cases to achieve a speed higher than the highest drive speed (maximum speed) at which the zoom lens can be driven. Then, even if it is required to drive a speed higher than the maximum speed, the drive speed is necessarily kept at the maximum speed, leading to an elongated drive time. Moreover, a sudden change in the acceleration is caused to possibly make the image unnatural. Moreover, the field-of-view change rate is not made substantially constant as desired.

SUMMARY OF THE INVENTION

An object of the present invention is to provide a lens apparatus in which the field-of-view change rate can be kept substantially constant and images can be made more natural when the lens is driven at high speed without elongation of the drive time.

To achieve the above object, an lens apparatus according to the present invention is characterized by including a magnification variator configured to move during magnification variation: a drive unit configured to drive the magnification variator; an output unit configured to output a first drive command; and a controller configured to: derive, based on the first drive command, a second drive command so that the second drive command satisfies a predetermined condition related to a moving speed of the magnification variator and a variation of a field-of-view change rate in a case where the magnification variator is driven with the second drive command is smaller than a variation of a field-of-view change rate in a case where the magnification variator is driven with the first drive command; and control the drive unit based on the second drive command.

The present invention can provide a lens apparatus in which the field-of-view change rate can be kept substantially constant and images can be made more natural when the lens is driven at high speed without elongation of the drive time.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
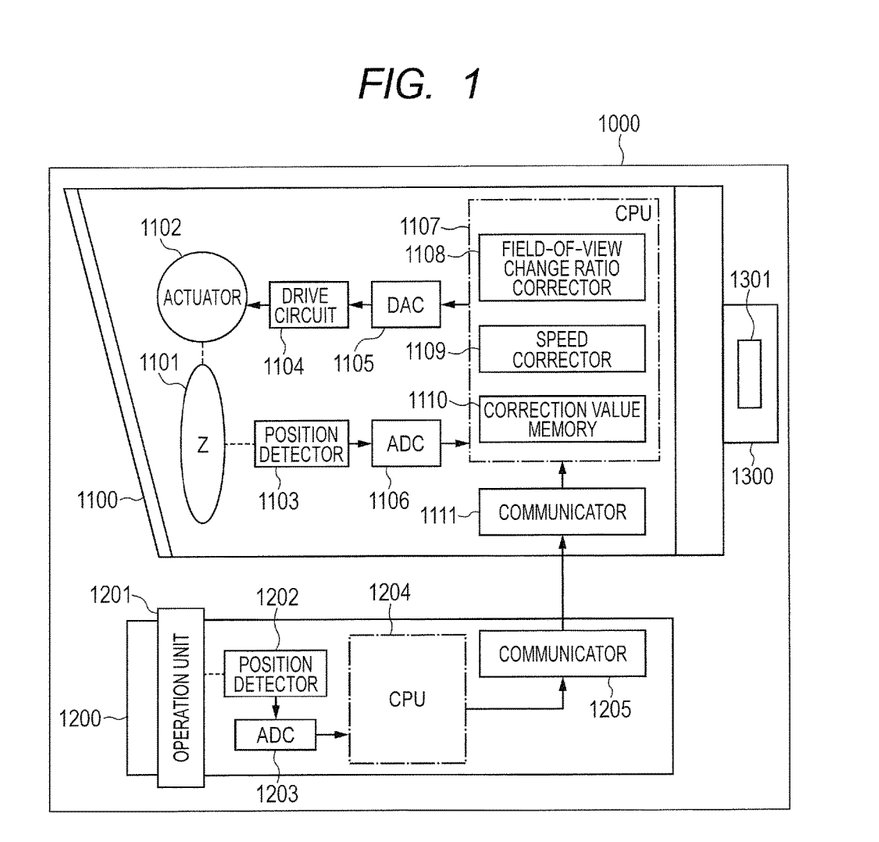
FIG. 1 is a block diagram showing the configuration of a first embodiment of the present invention.

In the following, the configuration of an image pickup system 1000 according to a first embodiment of the present invention will be described with reference to FIG. 1. The image pickup system 1000 includes a lens apparatus 1100, an operation apparatus 1200, and an image pickup apparatus 1300. The lens apparatus 1100 includes a zoom lens (magnification variator/optical member) 1101, an actuator 1102, a position detector 1103, a drive circuit 1104, a DAC 1105, an ADC 1106, a CPU 1107, and a communicator 1111. The lens apparatus 1100 further includes components that are not shown in the drawing, such as an image pickup optical system including optical adjusters such as a focus lens and an iris, and drive units for the optical adjusters. The lens apparatus 1100 is coupled with the image pickup apparatus 1300 having an image pickup element 1301 that picks up an optical image formed by the lens apparatus 1100. The image pickup apparatus 1300 receives light from the lens apparatus 1100 by the image pickup element 1301 and photoelectrically converts it. The lens apparatus 1100 is also coupled with the operation apparatus 1200. The operation apparatus 1200 includes an operation unit 1201, a position detector 1202, an ADC 1203, a CPU 1204, and a communicator 1205.

In the following, the components of the apparatus will be described in detail.

The zoom lens 1101 in the lens apparatus 1100 is moved along the optical axis to vary the focal length (or vary the magnification). The actuator 1102 may be a motor, which receives a drive signal from the drive circuit 1104 (described later) to move the zoom lens 1101 along the optical axis based on the drive signal. The DAC 1105 is a DA converter that converts a digital signal to an analogue signal. The ADC 1106 is an AD converter that converts an analogue signal into a digital signal. The position detector 1103 may be an encoder, which is linked with the zoom lens 1101 by a gear and outputs pulses in accordance with the amount of movement of the zoom lens 1101. The pulses thus generated are converted into a digital signal by the ADC 1106 and input to the CPU 1107. The CPU 1107 counts the input pulses to calculate the position of the zoom lens 1101. Moreover, the CPU 1107 differentiates the position of the zoom lens to calculate the speed of the zoom lens 1101. The drive circuit 1104 amplifies the analogue signal after conversion by the DAC 1105 and outputs it to the actuator 1102. The CPU 1107 constitutes a field-of-view change rate correction unit (controller) 1108, a speed corrector (controller) 1109, and a correction value memory 1110. The correction value memory 1110 stores values (correction values) based on the focal length information for positions of the lens apparatus 1100 along the optical axis. This data is specific to the individual lens apparatus, and it is desirable that the data be stored in advance. The correction values will be described in detail later. The CPU 1107 stores thresholds used in various processing that will be described later and programs. The communicator 1111 receives a command values sent from the operation apparatus 1200, which will be described later, and sends it to the CPU 1107. The field-of-view change rate correction unit 1108 and the speed corrector 1109 will be described in detail later.

The operation apparatus 1200 has an operation unit 1201. The operation unit 1201 is adapted to be returned to a center position by, for example, a spring mechanism when it is not operated by a user. The user can shift (or rotate) the operation unit 1201 from the center position (or neutral position) to left and right. When the operation unit 1201 is operated, the amount of operation (rotation angle) of the operation unit 1201 is measured by the position detector 1202. The operation amount thus measured is converted into a digital signal by the ADC 1203 and sent to the CPU 1204. The CPU 1204 calculates a speed by which the zoom lens 1101 is to be driven in accordance with the operation amount and outputs the calculated speed to the communicator 1205 as a command value (the first drive command). In this embodiment, the CPU 1204 is configured to calculate a speed by which the zoom lens 1101 is to be driven in accordance with the operation amount of the operation unit 1201. Alternatively, the CPU 1204 may be configured to calculate a position of the zoom lens 1101 to be reached or a drive amount.

With the above-described image pickup system 1000, the user can shoot images of an object while varying the field of view in shooing.

Figure 2:
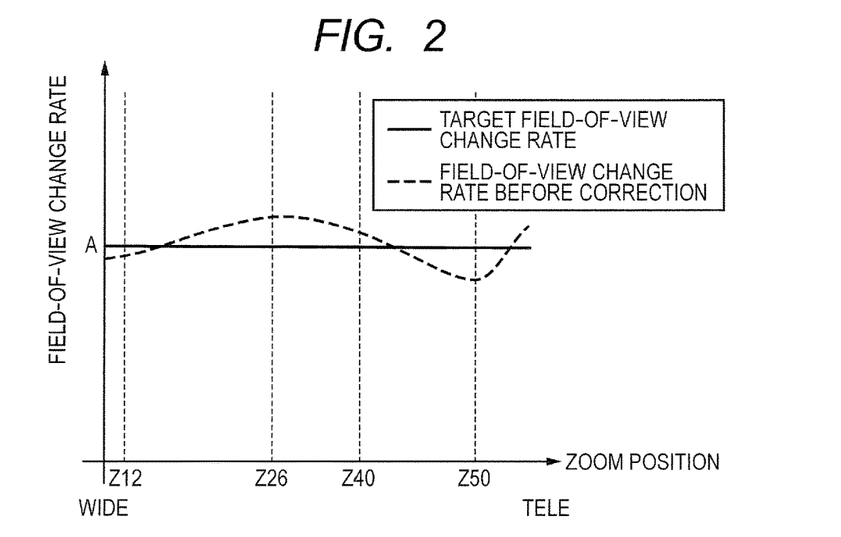
FIG. 2 is a graph showing relationship between the field-of-view change rate and the zoom position.

In the following, relationship between the zoom position of the lens apparatus 1100 and the field-of-view change rate in this embodiment will be described with reference to FIG. 2. In FIG. 2, the horizontal axis represents the position of the zoom lens 1101, and the vertical axis represents the field-of-view change rate.

The broken curve in FIG. 2 represents the field-of-view change rate relative to the zoom position in the lens apparatus 1100. As will be seen, the field-of-view change rate is not constant but varies with the zoom position, as described above. One method of correcting (or altering) the field-of-view change rate represented by the broken line in FIG. 2 into a substantially constant rate (represented by the solid line in FIG. 2) is increasing and decreasing the driving speed of the zoom lens 1101 depending on the zoom position, as described above. It should be noted that in this specification, the term "zoom position" does not necessarily refer to the physical position of the zoom lens along the optical axis. For example, in cases where a cam mechanism is used for zoom driving, the zoom position may refer to a value representing a displaced position of a cam member. Alternatively, in cases where a cylindrical cam is used for zoom driving, the zoom lens position may refer to a value representing a rotational angle of the cylindrical cam. The position of any component in the magnification variator made up of a movable lens for zooming, a drive mechanism including a cam for driving the movable lens, and other parts may serve as the zoom lens position described in the illustrative embodiment on condition that the position of that component (the position of the magnification variator) uniquely corresponds to the position of the movable lens. The present invention can be applied in such cases.

In the following, this method will be described.

In FIG. 2, the field-of-view change rate before correction (represented by the broke line) is lower than the constant field-of-view change rate (represented by the solid line) to be achieved at positions Z12 and Z50. At these positions, the drive speed of the zoom lens 1101 is increased by a certain degree. On the other hand, at positions Z26 and Z40, the field-of-view change rate before correction (represented by the broke line) is higher than the constant target field-of-view change rate (represented by the solid line). At these positions, the drive speed of the zoom lens 1101 is decreased by a certain degree. In this way, the field-of-view change rate can be made substantially constant by increasing and decreasing the drive speed when driving the zoom lens 1101 from the wide angle end to the telephoto end. It is preferred that the value of the target field-of-view change rate (represented by A in FIG. 2) be set in such a way that the drive time taken to achieve zooming from the wide angle end to the telephoto end after the correction is substantially equal to that before the correction.

In the following, the field-of-view change rate correction unit 1108 configured in the CPU 1107 will be described with reference to FIGS. 3, 4, 5A, and 5B. The field-of-view change rate correction unit 1108 performs above-described correction for making the field-of-view change rate substantially constant by increasing and decreasing the drive speed. In the following, the operation of the field-of-view change rate correction unit 1108 will be described with reference to the flow chart in FIG. 3.

Figure 3:
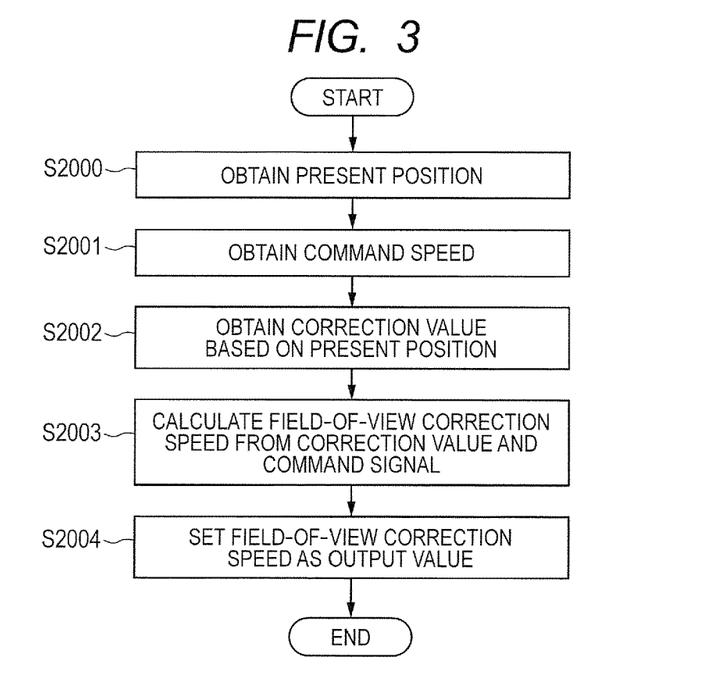
FIG. 3 is a flow chart of correction of the field-of-view change rate in the first embodiment.

Firstly, in step S2000, the CPU 1107 obtains the present position of the zoom lens 1101. The present position is obtained by calculation executed in the CPU 1107 based on pulses output from the position detector 1103. Then, in step S2001, a command speed is obtained. As describe above, the command speed is a speed output from the operation apparatus 1200 to the CPU 1107 through the communicator 1205 in the operation apparatus 1200 and the communicator 1111 in the lens apparatus 1100 (or a speed calculated in the CPU 1107 based on the output speed). Then, in step S2002, a correction value stored in the correction value memory 1110 is retrieved.

Figure 4:
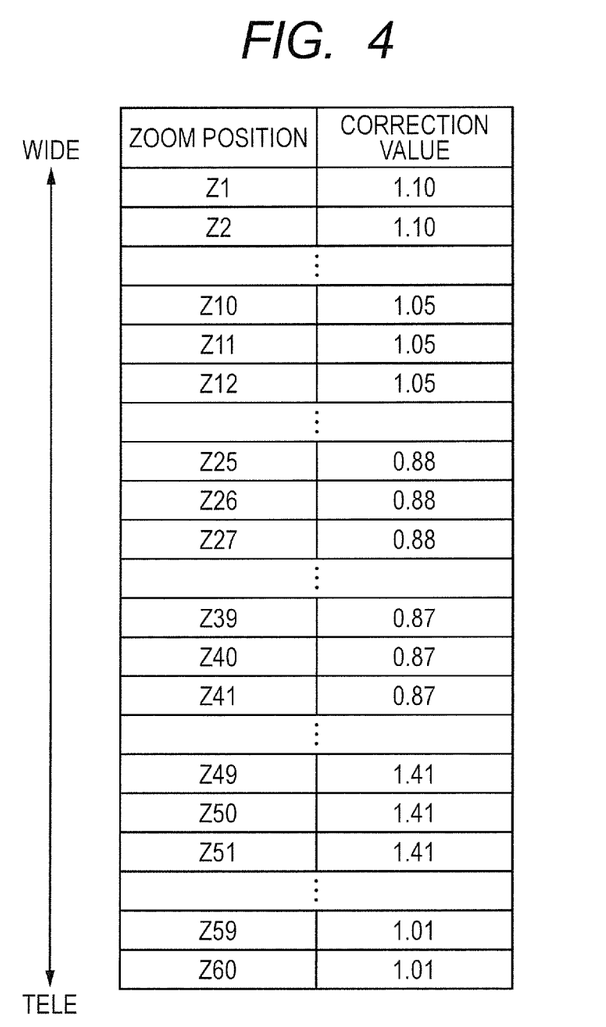
FIG. 4 shows an example of correction value table data used in correction of the field-of-view change rate.

Here, the correction values (correction information) stored in the CPU 1107 will be described with reference to FIG. 4. FIG. 4 shows exemplary correction values stored in the CPU 1107. In the left column in the table in FIG. 4 (zoom position), positions of the zoom lens 1101 are specified. Specifically, positions between the wide angle end and the telephoto end are represented by relative values from 1 to 60. In the right column in the table in FIG. 4 (correction value), correction values for the zoom lens 1101 for the respective zoom positions are specified. The correction values at the respective zoom positions can be calculated, for example, from the aforementioned field-of-view change rate before correction (represented by the broken line in FIG. 2) and the target constant field-of-view change rate (represented by the solid line in FIG. 2), though the method of calculation is not limited to this.

Returning back to FIG. 3, in step S2002, when the zoom lens 1101 is located, for example, at the position represented by 2, 1.10 is obtained as the correction value, and when the lens is located at the position represented by 25, 0.88 is obtained as the correction value. Then, in step S2003, a speed (third drive command) that makes the field-of-view change rate substantially constant is calculated based on the correction value obtained in step S2003. In step S2004, this speed is set as an output value. As above, a value of the speed that makes the field-of-view change rate substantially constant can be obtained for each zoom position by correcting the command speed received from the operation apparatus 1200 using a correction value based on the focal length of the zoom lens 1101 by the field-of-view change rate correction unit 1108.

Figure 5A:
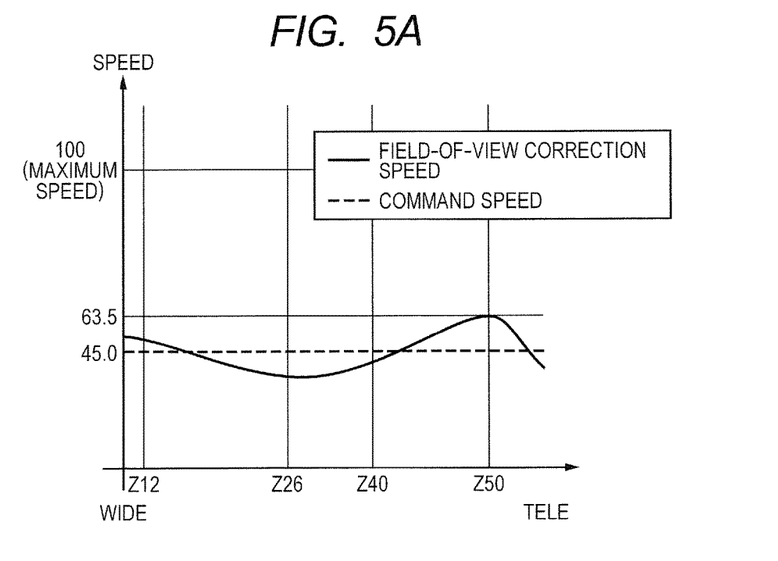
FIG. 5A shows relationship between the command speed and the zoom position in correction of the field-of-view change rate.

FIGS. 5A and 5B show relationship of the command speed and the speed calculated in the field-of-view change rate correction unit 1108 with the zoom position. In FIG. 5A, the horizontal axis represents the zoom position, and the vertical axis represents the value of the command speed. The command speed varies in the range between 0 and 100. It is assumed that when for example a command speed of 100 is input continuously, the zoom position shifts from the wide angle end position to the telephoto end position (namely through the entirety of the movable range, or the entire movable range) or from the telephoto end position to the wide angle end position (through the entire range) in 0.5 second, and when a command speed of 20 is input continuously, the zoom position shifts through the entire range in 90 seconds. Here, an exemplary case where a speed of 45 is input continuously by operating the operation apparatus 1200 to shift the zoom lens from the wide angle end position to the telephoto end position will be discussed. The waveform of the input speed in this case is represented by the broken line in the graph in FIG. 5A, and the waveform of the command speed after correction by the field-of-view change rate correction unit 1108 is represented by the solid curve in the graph in FIG. 5A. The sample positions (Z12, Z26, Z40, and Z50) indicated in the graph correspond to positions Z12, Z26, Z40, and Z50 in FIGS. 2 and 4.

Figure 5B:
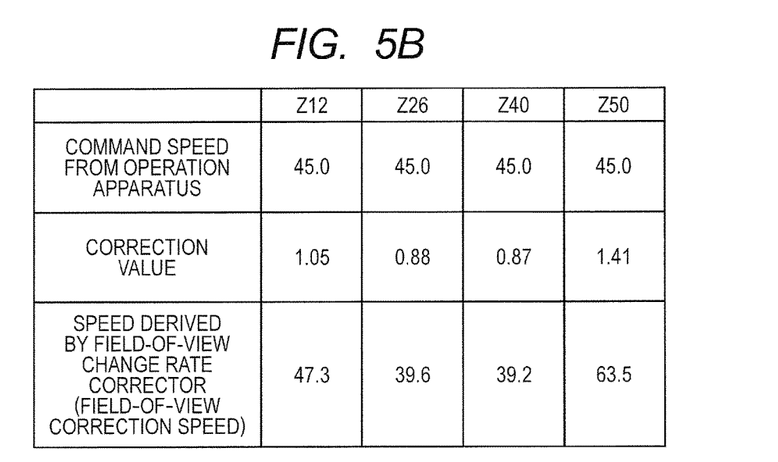
FIG. 5B shows relationship between the command speed and the zoom position in correction of the field-of-view change rate.

FIG. 5B, which is associated with FIG. 5A, shows the command speeds and the correction values stored in the correction value memory 1110, at the respective sample positions of the zoom. The first row of the table in FIG. 5B specifies the speed input from the operation apparatus 1200 (represented by the broken line in the graph in FIG. 5A), the second row specifies the correction value shown in FIG. 4, and the third row specifies the field-of-view correction speed after correction by the field-of-view change rate correction unit 1108 (represented by the solid line in the graph in FIG. 5A). For example, at position Z12, while the command speed input through the operation apparatus 1200 is 45, the field-of-view correction speed is 47.3.

In this exemplary case, the value of the field-of-view correction speed 63.5 at position Z50 is the largest field-of-view correction speed throughout the entire range.

As described above, in the field-of-view change rate correction unit 1108, the command speed input from the operation apparatus 1200 is corrected (namely increased or decreased) to make the field-of-view change rate substantially constant.

Figure 6:
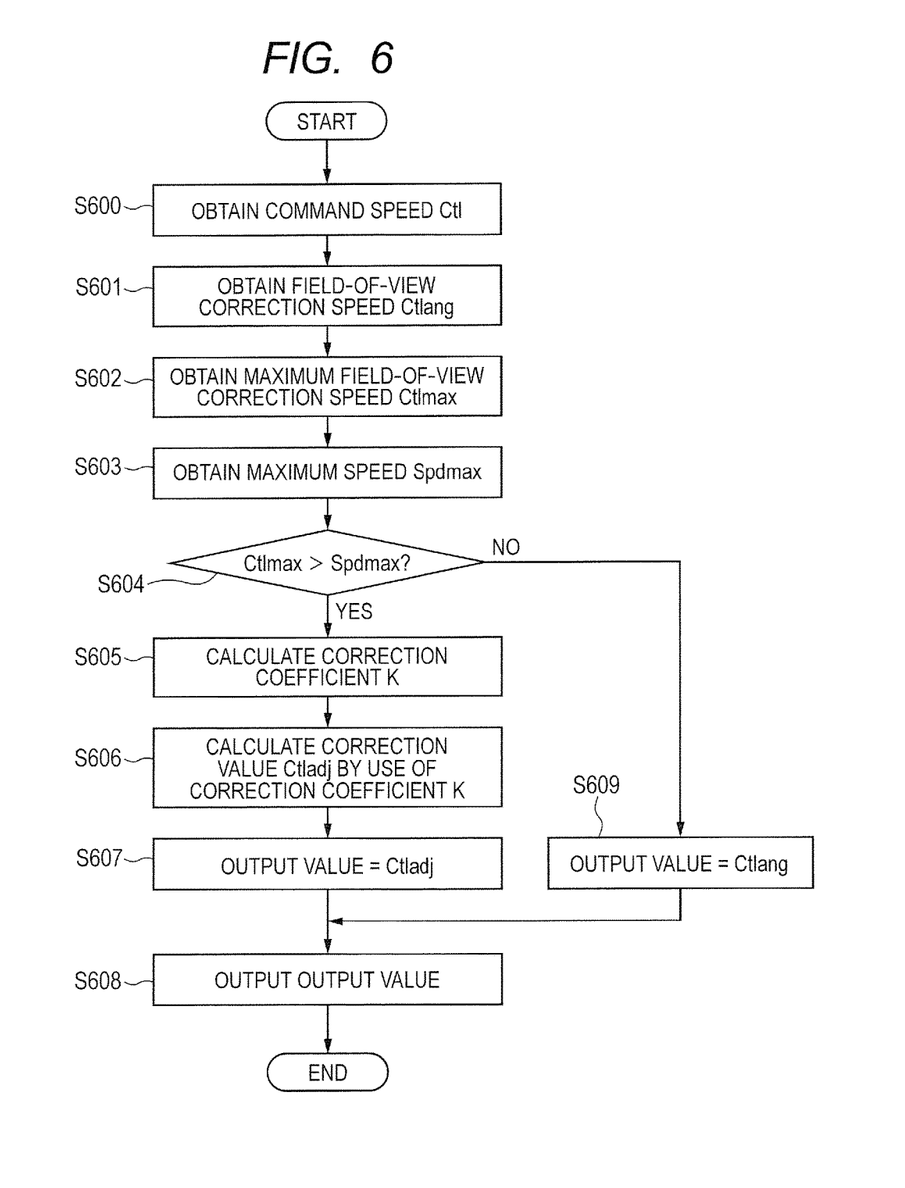
FIG. 6 is a flow chart of a process of correction of speed in the first embodiment.

In the following, the speed corrector 1109 will be described with reference to a flow chart in FIG. 6. Firstly in step S600, the CPU 1107 obtains a command speed (Ctl) 1107 output from the operation apparatus 1200. Then in step S601, the field-of-view correction speed (Ctlang) calculated by the field-of-view change rate correction unit 1108 is obtained. Then, in step S602, the maximum field-of-view correction speed (Ctlmax) is obtained. The maximum field-of-view correction speed (Ctlmax) is the highest value of the field-of-view correction speed calculated by the field-of-view change rate correction unit 1108 in the case where the command speed obtained in step S600 is continuously input throughout the entire range. For example, in the case shown in FIGS. 5A and 5B, the corrected speed (represented by the solid line) becomes highest at Z50. The value (63.5 in the case shown in FIG. 5A) at this position is the maximum field-of-view correction speed Ctlmax. The maximum field-of-view correction speed Ctlmax is determined based on the command speed Ctl from the operation apparatus 1200 and the correction value stored in the correction value memory 1110 in advance. Therefore, the value of the maximum field-of-view correction speed Ctlmax can be calculated at the time when the value of the command speed Ctl is determined, wherever the zoom lens 1101 is located.

Then, in step S603, the maximum speed Spdmax at which the zoom lens 1101 can be driven is obtained. The value of the maximum speed Spdmax is stored in advance in a memory (not shown) in the CPU 1107. In step S604, it is determined whether or not the maximum field-of-view correction speed Ctlmax satisfies a predetermined condition. Specifically, the value of the maximum field-of-view correction speed Ctlmax and the maximum speed Spdmax are compared, and if the maximum field-of-view correction speed Ctlmax is higher than the maximum speed Spdmax, the process proceeds to step S605, and if the maximum field-of-view correction speed Ctlmax is not higher than the maximum speed Spdmax, the process proceeds to step S609.

In step S605, a correction coefficient K is calculated by the following equation (1):

$$K = (Spdmax - Ctl)/(Ctlmax - Ctl) \quad (1),$$

where Spdmax is the maximum speed of the zoom lens 1101 obtained in step S603, Ctl is the command speed output from the operation apparatus 1200 obtained in step S600, and Ctlmax is the maximum field-of-view correction speed obtained in step S602. Thereafter, the process proceeds to step S606.

In step S606, a correction value Ctladj is calculated by the following equation (2):

$$Ctladj = (Ctlang - Ctl) \times K + Ctl \quad (2),$$

where Ctlang is the field-of-view correction speed obtained in step S601. Thereafter, the process proceeds to step S607.

In step S607, the output value is set to Ctladj. Then, in step S608, the value set as the output value (the second drive command) is output. In the case where it is determined in step S604 that the maximum field-of-view correction speed Ctlmax is smaller than the maximum speed Spdmax, the process proceeds to step S609, where the output value is set to Ctlang.

Figure 7A:
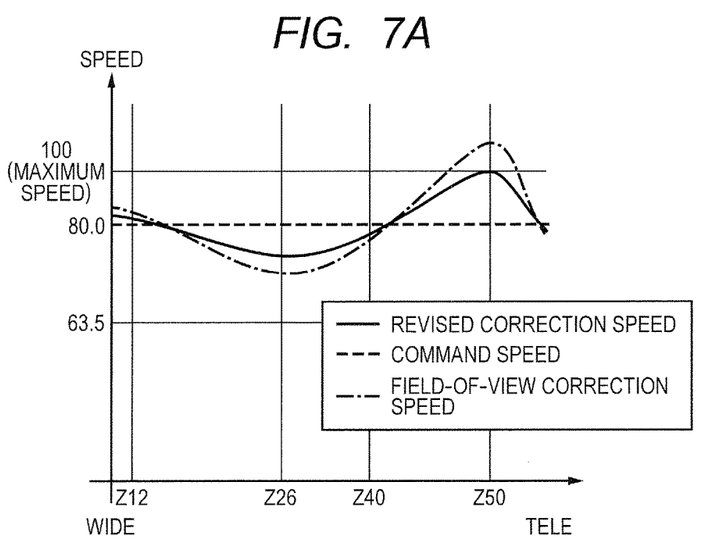
FIG. 7A shows relationship between command speed and the zoom position in correction of speed.
Figure 7B:
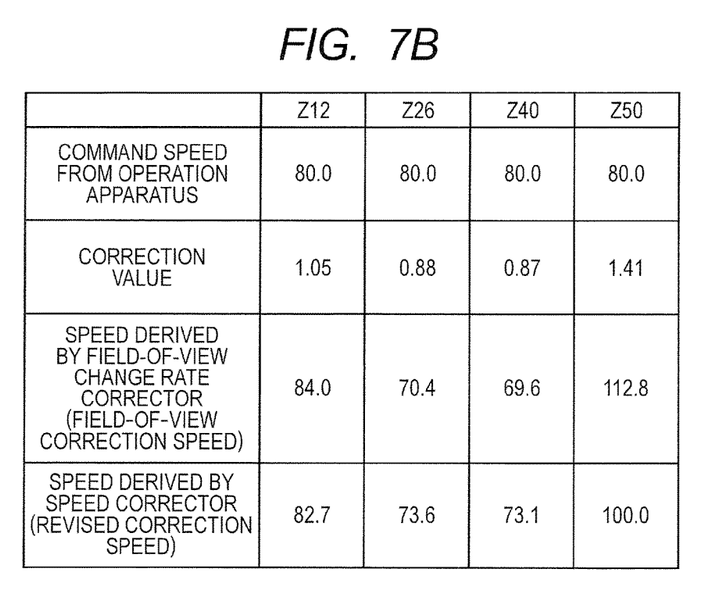
FIG. 7B shows relationship between command speed and the zoom position in correction of speed.

FIGS. 7A and 7B show the relationship of the input speed, the field-of-view correction speed, and the speed calculated by the speed corrector 1109 (revised correction speed) with the zoom position. In the graph in FIG. 7A, what is represented by the horizontal axis and the vertical axis is the same as that in FIGS. 5A and 5B. While FIGS. 5A and 5B show a case where a speed of 45 is input from the operation apparatus 1200 continuously throughout the zoom position range from the wide angle end position to the telephoto end position, FIGS. 7A and 7B show a case where a speed of 80 is input from the operation apparatus 1200 continuously throughout the zoom position range from the wide angle end position to the telephoto end position. In FIG. 7A, the waveform of the broken line represents the input speed, the waveform of the chain line represents the field-of-view correction speed, and the waveform of the solid line represents the revised correction speed. The sample positions (Z12, Z26, Z40, and Z50) indicated in FIG. 7A correspond to positions Z12, Z26, Z40, and Z50 in FIGS. 2, 4, 5A and 5B. The hatched area represents the region in which the field-of-view correction speed exceeds the maximum speed, namely the region in which the speed exceeds 100.

As in FIGS. 5A and 5B, FIG. 7B is associated with FIG. 7A. FIG. 7B shows the command speeds and the correction values stored in the correction value memory 1110, at the respective sample positions of the zoom. The first row of the table in FIG. 7B specifies the input speed (represented by the broken line in FIG. 7A), the second row specifies the correction value shown in FIG. 4, and the third row specifies the field-of-view correction speed (represented by the chain line in FIG. 7A). Moreover, the fourth row specifies the revised correction speed (represented by the solid line in FIG. 7A). In the terminology used in the flow chart in FIG. 6, the broken line represents command speed Ctl, the chain line represents Ctlang, and the solid line represents Ctladj.

Let us consider an exemplary case where the present position is Z11 and a speed of 45 is input from the operation apparatus 1200. In this case, the maximum field-of-view correction speed Ctlmax is 63.5 as shown in FIG. 5B, which is lower than the maximum speed Spdmax (100). Then, the decision made in step S604 in FIG. 6 (Ctlmax>Spdmax?) is answered in the negative, and the process proceeds to step S609, where the output value at position Z11 is set to Ctlang (47.3). In another exemplary case where the present position is Z11 and a speed of 80 is input from the operation apparatus 1200, the maximum field-of-view correction speed ctlmax is 112.8 as shown in FIGS. 7A and 7B, which is higher than the maximum speed Spdmax (100). Then, the decision made in step S604 in FIG. 6 (Ctlmax>Spdmax?) is answered in the affirmative, and the process proceeds to step S605, where the output value at position Z11 is set to Ctladj (82.7).

As above, in cases where the maximum field-of-view correction speed exceeds the maximum zoom speed, the speed corrector 1109 calculates a speed using the coefficient K in equation (1). Since the coefficient K is determined in such a way that the maximum field-of-view correction speed becomes substantially equal to the maximum zoom speed, the speed calculated by the speed corrector 1109 can be made lower than or equal to the maximum speed at any zoom position. Referring to FIG. 7B, at position Z50, while the field-of-view correction speed is 112.8, the revised correction speed is 100.0. In this case, the value of the field-of-view correction speed is decreased. On the other hand, at position Z26, while the field-of-view correction speed is 70.4, the revised correction speed is 73.6. In this case, the value of the field-of-view correction speed is increased. This means that the speed corrector 1109 decreases the magnitude of change of the waveform represented by the chain line in FIG. 7A by a specific ratio (coefficient K). In this way, the decrease of the speed in the hatched area in FIG. 7A is compensated for by the increase of the speed at other positions (Z26, Z40 etc.), so that the increase and the decrease of the speed cancel out each other to make the speed after the correction in zoom driving over the entire range substantially equal to that before the correction.

In the prior arts, when the zoom speed is increased and decreased to make the field-of-view change rate substantially constant, the zoom speed is required to be made higher than the possible zoom drive speed (or the maximum speed) in a certain range(s). Therefore, the field-of-view change rate cannot be corrected as desired in that range(s). While the zoom drive speed is required to be made higher than the maximum speed in that range(s), the actual zoom speed is limited to the maximum speed. Therefore, there is a possibility that the drive speed may become longer. Moreover, limitation at the maximum speed causes an abrupt change in the acceleration, possibly making the captured image unnatural.

In this embodiment, when the speed command calculated in the process of correction for making the field-of-view change rate substantially constant exceeds the maximum speed at a certain position, the value of the speed command is decreased to keep it below the maximum speed. Moreover, the value of the speed command is increased at other positions to compensate for the aforementioned decrease. Thus, a speed command lower than the maximum speed with which the variation of the field-of-view change rate is smaller than the variation of the field-of-view change rate in the case where optical member is driven at a constant speed and the drive time over the entire drive range is kept unchanged is calculated, and zoom driving is performed based on the speed command thus calculated. The variation mentioned above can be evaluated by the magnitude of variation, the frequency of variation, and/or the speed of variation etc. Therefore, the problem of the prior art described above is solved.

While this embodiment has been described on the assumption that the command speed input from the operation apparatus 1200 is constant throughout the entire zoom range, the command speed input from the operation apparatus 1200 may be varied during zoom driving.

While correction about the zoom lens 1101 has been described in this embodiment, the present invention can also be applied to other optical adjusters such as the focus lens and the stop.

Second Embodiment

Figure 8:
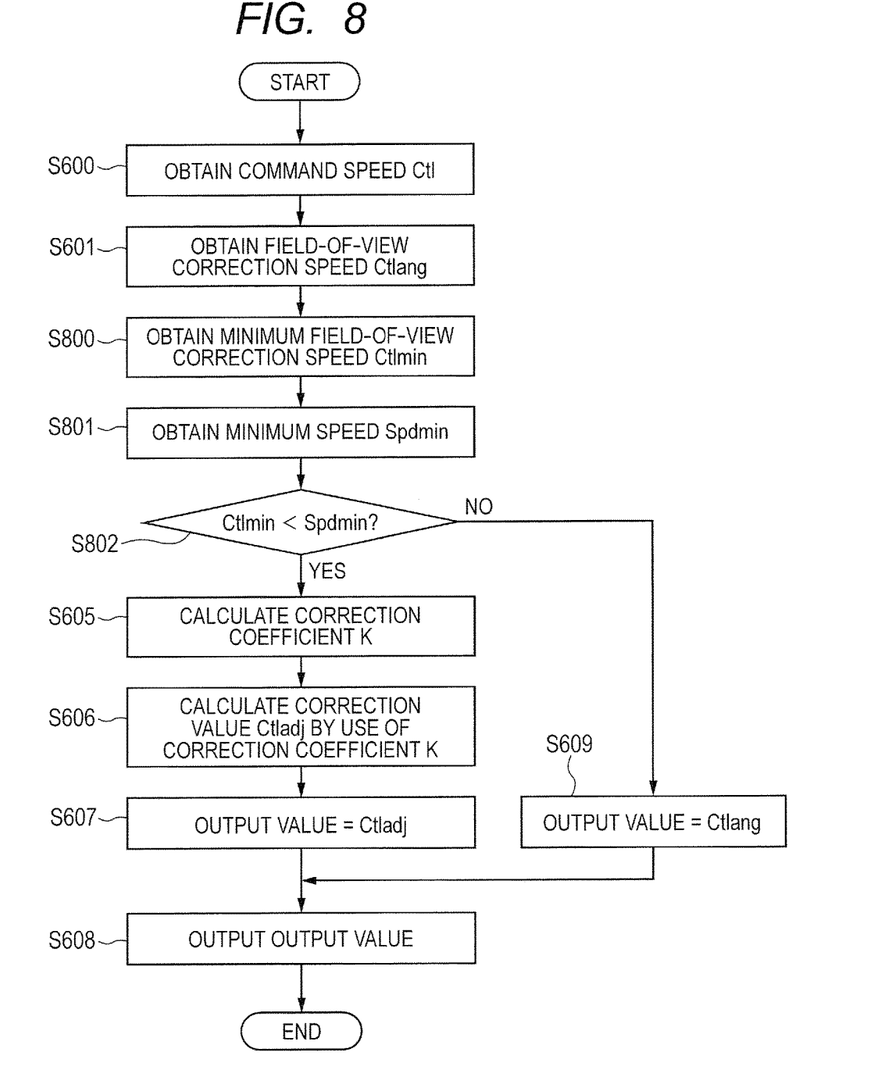
FIG. 8 is a flow chart of correction of speed in a second embodiment.

In the following, a second embodiment of the present invention will be described with reference to FIG. 8.

In the first embodiment, when the command speed for making the field-of-view change rate substantially constant is higher than the possible drive speed (or the maximum speed) of the zoom lens 1101, a revised speed within the possible drive speed range is calculated in the speed corrector 1109.

In this embodiment, when the command speed for making the field-of-view change rate substantially constant is lower than a predetermined speed of the zoom lens 1101, a command speed is calculated in the speed corrector 1109 and output.

The configuration of the image pickup system 1000 in this embodiment is the same as that in the first embodiment and will not be described further.

In the following, the processing performed in the speed corrector 1109 in this embodiment will be described with reference to FIG. 8. The processing steps same as those in the flow chart in FIG. 6 in the first embodiment will be denoted by the same reference signs and will not be described further.

In step S800, the minimum field-of-view correction speed (Ctlmin) is obtained. The minimum field-of-view correction speed Ctlmin is the lowest value of the field-of-view correction speed calculated by the field-of-view change rate correction unit 1108, contrary to the maximum field-of-view correction speed Ctlmax in the first embodiment shown in FIG. 6. As with the maximum field-of-view correction speed Ctlmax, the value of the minimum field-of-view correction speed Ctlmin is determined at the time when the value of the command speed Ctl is determined, wherever the zoom lens 1101 is located.

Then, in step S801, the minimum speed Spdmin of the zoom lens 1101 is obtained, and the process proceeds to step S802. It is preferred that the minimum speed Spdmin be set to the lowest speed at which the zoom lens 1101 can move smoothly. The value of the minimum speed Spdmin is stored in advance in a memory (not shown) in the CPU 1107. In step S802, it is determined whether or not the minimum field-of-view correction speed Ctlmin satisfies a predetermined condition. Specifically, the value of the minimum field-of-view correction speed Ctlmin and the minimum speed Spdmin are compared, and if the minimum field-of-view correction speed Ctlmin is lower than the minimum speed Spdmin, the process proceeds to step S605, and if the minimum field-of-view correction speed Ctlmin is not lower than the minimum speed Spdmin, the process proceeds to step S609. In step S605, a correction coefficient K is calculated by the following equation (3):

$$K = (Spdmin - Ctl) / (Ctlmin - Ctl) \qquad (3).$$

As described above, in this embodiment, when the minimum field-of-view correction speed Ctlmin is lower than the minimum speed Spdmin of the zoom lens 1101, the speed corrector 1109 calculates command speeds that are higher than or equal to the minimum speed at all the zoom positions.

As described above, the minimum speed is typically set to the lowest speed at which the zoom lens 1101 can be moved smoothly. When a movable lens is driven by the operation apparatus, the movable lens can generally be driven at a speed higher than zero. To ensure stable driving, the minimum speed is set in the normal use due to constraints necessitated by control and constraints necessitated by hardware of the apparatus. Therefore, if the zoom lens 1101 is driven by a speed command lower than the minimum speed, the zoom lens may stop in the middle of the driving or move and stop alternately in spite of the given command. This makes the picked up image awkward. In this embodiment, when a speed command lower than the minimum speed is necessary in order to make the field-of-view change rate substantially constant, the speed corrector 1109 can change the speed to make it higher than the minimum speed. Therefore, the aforementioned awkwardness can be decreased.

Third Embodiment

A third embodiment of the present invention will be described with reference to FIGS. 9 and 10.

In the first embodiment, when the command value for making the field-of-view change rate substantially constant is higher than the maximum speed of the zoom lens 1101, the speed corrector 1109 calculates and outputs a command value within the possible drive speed range.

In the second embodiment, when the command value for making the field-of-view change rate substantially constant is lower than the minimum speed of the zoom lens 1101, the speed corrector 1109 calculates and outputs a speed command higher than minimum speed.

In this embodiment, when the command speed for making the field-of-view change rate substantially constant falls out of a predetermined speed range that can be set by the user, the speed corrector 1109 calculates and outputs a command speed within the predetermined speed range.

The configuration of an image pickup system 1000 of the third embodiment will be described with reference to FIG. 9. The components same as those in the first embodiment are denoted by the same reference signs and will not be described further.

Figure 9:
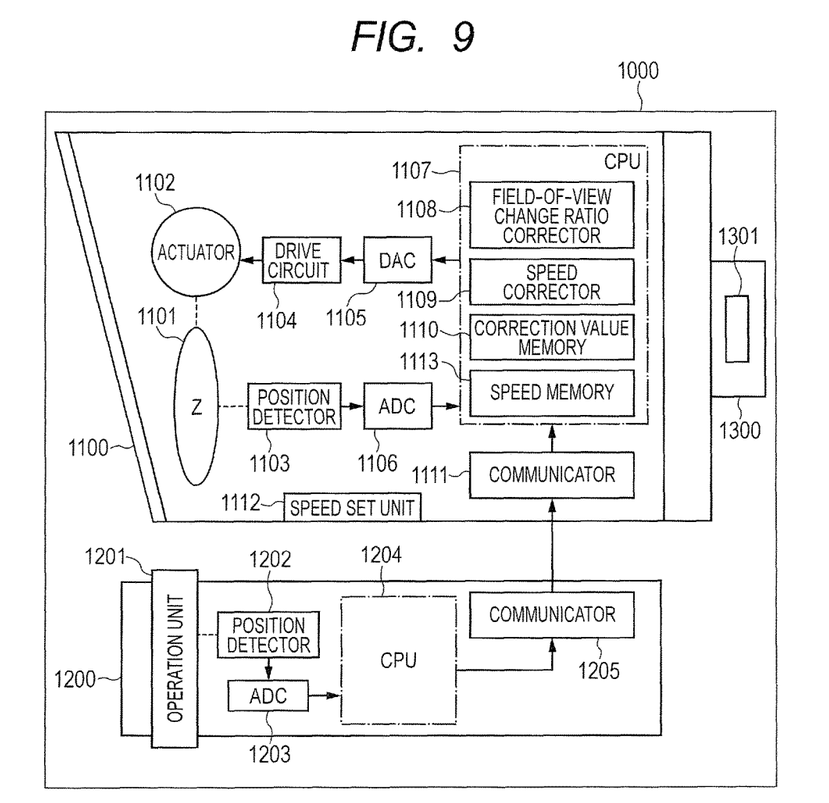
FIG. 9 is a block diagram showing the configuration of a third embodiment of the present invention.
Figure 10:
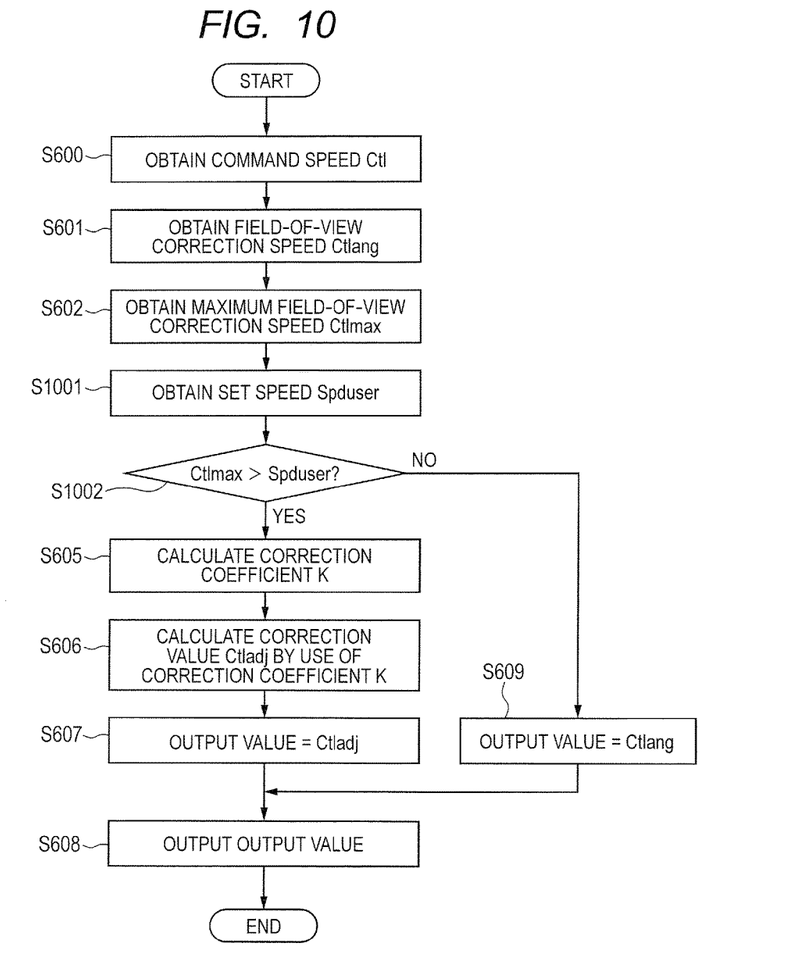
FIG. 10 is flow chart of correction of speed in the third embodiment.

In FIG. 9, a speed setting unit (setting unit) 1112 allows a user to set the maximum drive speed of the zoom lens 1101. A speed memory (condition memory) 1113 stores the maximum drive speed Spduser set with the speed setting unit 1112. The aforementioned maximum drive speed is used in processing performed by the speed corrector 1109 as described above.

In the following, the processing performed by the speed corrector 1109 in this embodiment will be described with reference to FIG. 10. The processing steps same as those in the flow chart in FIG. 6 in the first embodiment will be denoted by the same reference signs and will not be described further.

In step S1001, the drive speed SPduser of the zoom lens 1101 stored in the speed memory 1113 is retrieved. Then, in step S1002, it is determined whether or not the maximum field-of-view correction speed Ctlmax satisfies a predetermined condition. Specifically, the maximum field-of-view correction speed Ctlmax and the drive speed Spduser are compared. If Ctlmax is higher than Spduser, the process proceeds to step S605. If Ctlmax is not higher than Spduser, the process proceeds to step S609.

As described above, in this embodiment, the setting unit that allows setting by a user and the memory that stores the speed set by the user are provided, and the speed corrector 1109 calculates a command speed on the basis of the speed stored in the memory.

When operating, an actuator generally generates sound, which becomes louder as the drive speed of the actuator increases. The operation sound of the actuator in the high speed driving state is superposed on the sound in the captured image in, for example, moving image shooting in some cases. In this embodiment, when the command speed for making the field-of-view change rate substantially constant is higher than the set speed, the speed corrector 1109 can limit it to the set speed. This can reduce the operation sound of the actuator that affects the captured image.

While in this embodiment the speed set with the speed setting unit 1112 serves as an upper limit speed in the calculation of a speed command by the speed corrector 1109, the speed set with the speed setting unit 1112 may serve as a lower limit speed. Alternatively, the speed setting unit 1112 may be adapted to allow a user to set an upper limit speed and a lower limit speed that define a speed range. Alternatively, the speed setting unit 1112 may be adapted to allow a user to set an upper limit conditional value and/or a lower limit conditional value of the moving speed of the zoom lens and/or upper and lower limit conditional value.

The field of view represents the extent of the image pickup range or the length corresponding to the image size in a plane at an object distance conjugate with the image plane. The field-of-view change rate is the rate of change of the field-of-view per unit time in the case where a driven object is driven by the drive unit at a constant speed for zooming operation.

In the context of this specification, the term "zoom lens position (or zoom position)" does not necessarily mean a physical position with respect to the direction of the optical axis of the zoom lens. For example, in cases where a cam mechanism is used for zoom driving, the zoom lens position may be a value representing a displaced position of a cam member. Alternatively, in cases where a cylindrical cam is used for zoom driving, the zoom lens position may be a value representing a rotational angle of the cylindrical cam. The position of any component among the optical members provided for zooming such as a movable lens and a drive mechanism including a cam for driving the movable lens may serve as the zoom lens position described in the illustrative embodiment described above on condition that the position of that component (the position of the optical member) uniquely corresponds to the position of the movable lens. The present invention can be applied in such cases.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-081282, filed Apr. 10, 2015, which is hereby incorporated by reference herein in its entirety.

What is claimed is:

1. A lens apparatus comprising:
a lens configured to be moved along an optical axis for varying a focal length of the lens apparatus;
an actuator configured to move the lens; and
a controller configured to:
obtain a first command for the actuator;
derive a second command for the actuator based on the first command so that a variation of a field-of-view change rate in a case where the lens is moved along the optical axis based on the second command is smaller than a variation of a field-of-view change rate in a case where the lens is moved along the optical axis based on the first command; and
output the second command to control the actuator,
wherein, in a case where a moving speed of the lens for the second command about a first position of the lens exceeds a predetermined limit speed of the lens, the controller is configured to derive the second command so that a moving speed of the lens for the second command about the first position does not exceed the predetermined limit speed, and a moving speed of the lens for the second command about a second position, different from the first position, of the lens is changed to compensate for change in time necessary to move the lens due to the derived second command about the first position.

2. A lens apparatus according to claim 1, wherein the controller is configured to derive the second command such that a time necessary to move the lens based on the second command becomes equal to a time necessary to move the lens based on the first command.

3. A lens apparatus according to claim 1, wherein the controller is configured to derive the second command such that a time necessary to move the lens over a movable range of the lens based on the second command becomes equal to a time necessary to move the lens over the movable range based on the first command.

4. A lens apparatus according to claim 1, wherein the predetermined limit speed is a predetermined maximum speed of the lens.

5. A lens apparatus according to claim 1, wherein the predetermined limit speed is a predetermined minimum speed of the lens.

6. A lens apparatus according to claim 1, wherein the controller is configured to obtain the first command from an operation apparatus which outputs the first command.

7. A lens apparatus according to claim 1, further comprising a memory configured to store information of a relation between a position of the lens and a correction value, wherein the controller is configured to derive the second command with the correction value obtained based on the first command and the information.

8. A lens apparatus according to claim 7, wherein the correction value is a value for correcting the field-of-view change rate about a position of the lens.

9. A lens apparatus according to claim 7, wherein the controller is configured to derive a third command so as to make the field-of-view change rate in a movable range of the lens constant based on the first command and the information, wherein the controller is configured to use the third command as the second command in a case where a speed of the lens corresponding to the third command does not exceed the predetermined limit speed, and wherein the controller is configured to derive the second command based on the third command in a case where a speed of the lens corresponding to the third command exceeds the predetermined limit speed.

10. A lens apparatus according to claim 1, further comprising a setting device configured to set the predetermined limit speed.

11. A lens apparatus according to claim 10, further comprising a memory that stores the predetermined limit speed set by the setting device.

12. An image pickup apparatus comprising:
a lens apparatus; and
an image pickup element configured to pick up an image formed by the lens apparatus,
wherein the lens apparatus includes:
   a lens configured to be moved along an optical direction for magnification variation;
   an actuator configured to move the lens; and
   a controller configured to:
      obtain a first command for the actuator;
      derive a second command for the actuator based on the first command so that a variation of a field-of-view change rate in a case where the lens is moved along the optical axis based on the second command is smaller than a variation of a field-of-view change rate in a case where the lens is moved along the optical axis based on the first command; and
      output the second command to control the actuator,
wherein, in a case where a moving speed of the lens for the second command about a first position of the lens exceeds a predetermined limit speed of the lens, the controller is configured to derive the second command so that a moving speed of the lens for the second command about the first position does not exceed the predetermined limit speed, and a moving speed of the lens for the second command about a second position, different from the first position, of the lens is changed to compensate for change in time necessary to move the lens due to the derived second command about the first position.

* * * * *